United States Patent
Massman et al.

(10) Patent No.: US 11,242,206 B2
(45) Date of Patent: Feb. 8, 2022

(54) VIBRATORY CONVEYOR

(71) Applicant: General Kinematics Corporation, Crystal Lake, IL (US)

(72) Inventors: Steve Massman, Poplar Grove, IL (US); Kerry Quinn, Palatine, IL (US)

(73) Assignee: General Kinematics Corp., Crystal Lake, IL (US)

( * ) Notice: Subject to any disclaimer, the term of this patent is extended or adjusted under 35 U.S.C. 154(b) by 0 days.

(21) Appl. No.: 17/110,217

(22) Filed: Dec. 2, 2020

(65) Prior Publication Data
US 2021/0171287 A1    Jun. 10, 2021

Related U.S. Application Data

(60) Provisional application No. 62/943,761, filed on Dec. 4, 2019.

(51) Int. Cl.
| B65G 27/08 | (2006.01) |
| B65G 27/26 | (2006.01) |
| B65G 27/20 | (2006.01) |

(52) U.S. Cl.
CPC ............. *B65G 27/08* (2013.01); *B65G 27/26* (2013.01); *B65G 27/20* (2013.01)

(58) Field of Classification Search
CPC ......... B65G 27/08; B65G 27/20; B65G 27/26
See application file for complete search history.

(56) References Cited

U.S. PATENT DOCUMENTS

| 2,951,581 | A | * | 9/1960 | Long | B65G 27/30 |
| | | | | | 198/763 |
| 3,089,582 | A | * | 5/1963 | Musschoot | B65G 27/20 |
| | | | | | 198/761 |
| 3,134,483 | A | | 5/1964 | Musschoot et al. | |
| 3,232,431 | A | | 2/1966 | Musschoot et al. | |
| 3,706,372 | A | | 12/1972 | Musschoot | |
| 3,750,866 | A | | 8/1973 | Musschoot | |
| 10,124,963 | B1 | | 11/2018 | Steffes, Jr. | |
| 2020/0369475 | A1 | | 11/2020 | Massman et al. | |

FOREIGN PATENT DOCUMENTS

| DE | 1005899 | 4/1957 |
| JP | S57131613 | 8/1982 |

OTHER PUBLICATIONS

International Search Report and Written Opinion, counterpart International App. No. PCT/US2020/062940 (dated Mar. 18, 2021) (13 pages).

* cited by examiner

*Primary Examiner* — William R Harp
(74) *Attorney, Agent, or Firm* — Cook Alex Ltd.

(57) ABSTRACT

A conveyor includes a trough with a floor having an upper surface configured to receive items to be conveyed in at least a first direction from a first end to a second end. The conveyor also includes a platform with at least one exciter attached thereto. The at least one exciter has at least one shaft with an eccentric mass attached thereto, the shaft having an axis of rotation about which the mass is rotated. The conveyor also includes a base. At least one first toroidal resilient member is disposed between the trough and the platform, and at least one second toroidal resilient member disposed between the platform and the base.

16 Claims, 3 Drawing Sheets

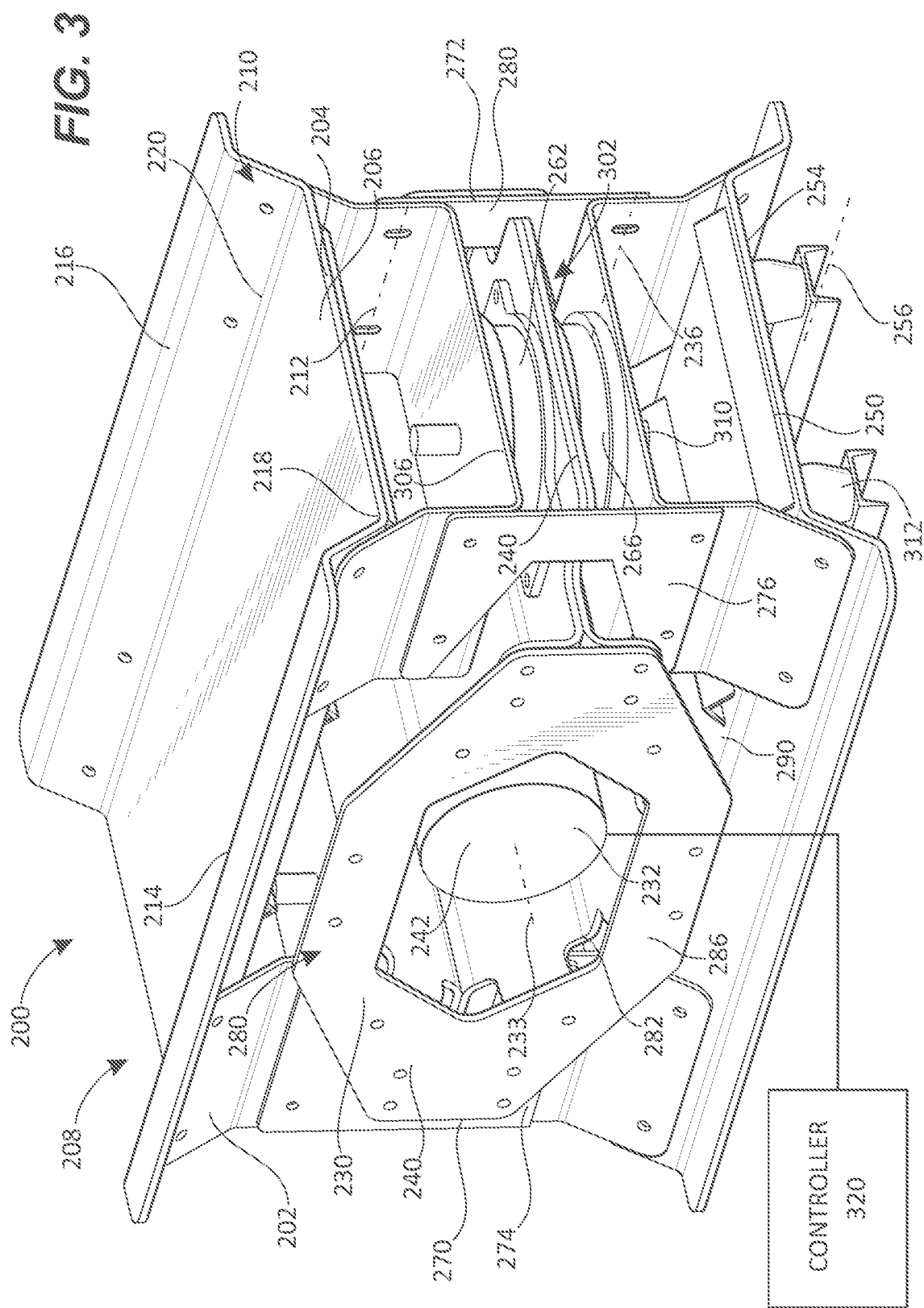

VIBRATORY CONVEYOR

CROSS-REFERENCE TO RELATED APPLICATIONS

This patent claims the benefit of U.S. Provisional Patent App. No. 62/943,761, filed Dec. 4, 2019, which is expressly incorporated herein by reference in its entirety.

BACKGROUND

This patent is directed to a vibratory apparatus, and, in particular, to a vibratory conveyor.

Conventional vibratory conveyors typically include a trough that is supported on a plurality of pairs of coil springs and stabilizers (also referred to as rocker legs). Each of the coil springs is fixedly attached at one end to the trough, and at the other end to another structure. Similarly, the stabilizers are pivotally connected at one end to trough, and at the other end to another structure.

While this is a conventional solution to supporting the trough, the solution requires numerous parts. Each coil spring and each stabilizer adds to the cost of the conveyor. In addition, each coil spring and each stabilizer requires installation and maintenance. Further, each pair adds to the size of the conveyor as a consequence of the physical size of the individual devices (coil spring and stabilizer), the physical size of the mounts for each end of the devices, and the clearances needed to permit the devices to be installed, to operate and to be maintained.

It thus would be advantageous to overcome or substantially ameliorate one or more of the disadvantages of such existing coil spring/stabilizer pairs as they are used in vibratory apparatuses, or at least to provide a useful alternative.

SUMMARY

A conveyor includes a trough with a floor having an upper surface configured to receive items to be conveyed in at least a first direction from a first end to a second end. The conveyor also includes a platform with at least one exciter attached thereto. The at least one exciter has at least one shaft with an eccentric mass attached thereto, the shaft having an axis of rotation about which the mass is rotated. The conveyor also includes a base. At least one first toroidal resilient member is disposed between the trough and the platform, and at least one second toroidal resilient member disposed between the platform and the base.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 3 is a frontal perspective view of the embodiment of FIG. 2 from the right end.

DETAILED DESCRIPTION OF VARIOUS EMBODIMENTS

As illustrated in the attached drawings, In general terms, a conveyor includes a trough with a floor having an upper surface configured to receive items to be conveyed in at least a first direction from a first end to a second end. The conveyor also includes a platform with at least one exciter attached thereto, the at least one exciter having at least one shaft with an eccentric mass attached thereto, the shaft having an axis of rotation about which the mass is rotated, and a base. Further, the conveyor includes at least one first toroidal resilient member disposed between the trough and the platform, and at least one second toroidal resilient member disposed between the platform and the base.

The toroidal resilient members include an annular rubber or synthetic polymer ring having an opening disposed in the center about a central axis. The central axis of the at least one first toroidal resilient member and the central axis of the at least one second toroidal resilient member are parallel or coincident (or aligned) with each other. The central axes are transverse to a plane in which the floor of the trough is disposed.

Figure 1:
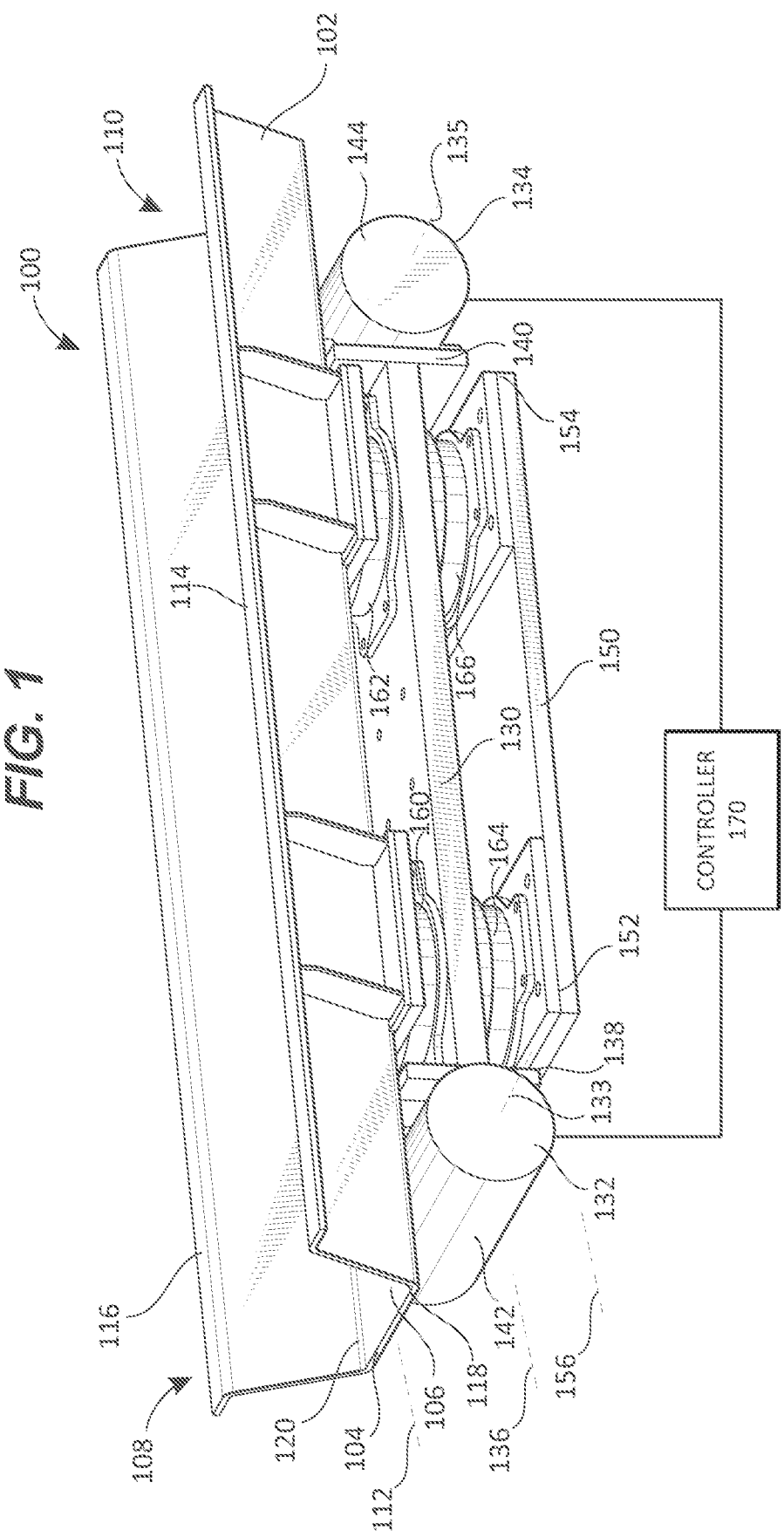
FIG. 1 is a frontal perspective view of an embodiment of a vibratory conveyor.
Figure 2:
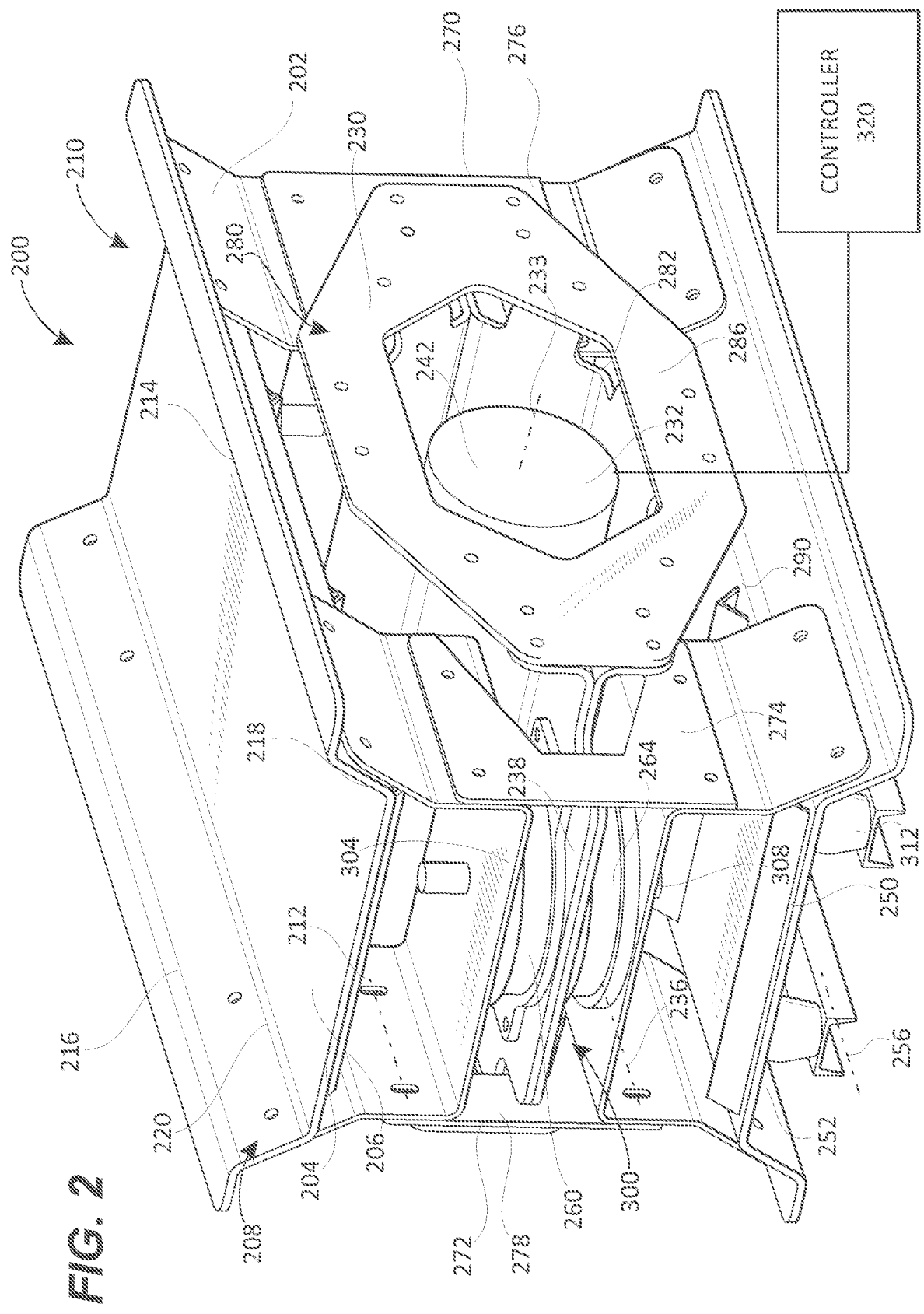
FIG. 2 is a frontal perspective view of another embodiment of vibratory conveyor from the left end.

As illustrated in the embodiments in FIGS. 1-3, there are two first toroidal members disposed between the trough and the platform, and two second toroidal members disposed between the platform and the base. In the embodiment of FIGS. 2 and 3, only one pair of the first and second toroidal members is illustrated in FIG. 2 or FIG. 3, but the other set of first and second toroidal members is disposed similarly at the other end of the trough, platform, and base, with an axis of symmetry about the center of the trough, platform and base. As to each pair, the central axes of the first and second toroidal members are illustrated as coincident or aligned, with the central axes of the first toroidal members being parallel to each other and the central axes of the second toroidal members being parallel to each other.

The plane in which the floor of the trough is disposed may be defined most simply where the floor of the trough is planar, as illustrated. However, even if the floor of the trough is textured such that the floor is not planar, it may be possible to identify a plane in which the floor is disposed, for example, by defining the plane with reference to the motion of the material along the floor.

Referring first to the conveyor in FIG. 1, the conveyor 100 includes a trough 102 with a floor 104 having an upper surface 106 configured to receive items to be conveyed in at least a first direction from a first end 108 to a second end 110. The first and second ends 108, 110 are disposed along a longitudinal axis 112 as illustrated.

It will be recognized that the trough 102, and in particular the floor 104, need not extend in a linear fashion between the first and second ends 108, 110. That is, the trough 102 (and the floor 104) may be curved between the first and second ends 108, 110. As such, the first and second ends 108, 110 may be disposed about a curved path (which path may have a center of curvature) with items conveyed at least in the first direction from the first end 108 to the second end 110 along the curved path.

It will also be recognized that while the conveyor 100 may convey items in at least a first direction from the first end 108 to the second end 110, it may be possible to convey items also in a second direction from the second end 110 to the first end 108. The direction of motion may be selected by the operation of the exciters as described below. The operation of the exciters may, in turn, be controlled by a controller (such as may be defined by a microprocessor programmed with a set of instructions) that can vary the operation of one or more of the exciters, independently or relative to each other.

The trough 102 has side walls 114, 116 that define the first and second sides (or edges) 118, 120 of the floor 104. The side walls 114, 116 may depend from the sides 118, 120 of the floor 104 at an obtuse angle as illustrated. Alternatively, the side walls 114, 116 may be orthogonal to the floor 104 according to other embodiments, for example.

The conveyor 100 also includes a platform 130 with at least one exciter 132, 134 attached thereto. As illustrated, there are two exciters 132, 134. The exciters 132, 134 each have at least one shaft with an eccentric mass attached thereto, the shaft having an axis of rotation 133, 135 about which the mass is rotated.

As illustrated in FIG. 1, the trough 102 has a longitudinal axis 112, with the first and second ends 108, 110 spaced from each other along the longitudinal axis 112. Further, the platform 130 has a longitudinal axis 136 along which first and second ends 138, 140 are disposed, with the longitudinal axis 136 of the platform 130 parallel to the longitudinal axis 112 of the trough 102. Further, the exciters 132, 134 each include a motor 142, 144 having a motor shaft with at least one eccentric mass disposed on the motor shaft. The first motor 142 is disposed at the first end 138 of the platform 130, and the second motor 144 is disposed at the second end 140 of the platform 130.

In addition, the conveyor 100 includes a base 150. Like the trough 102 and the platform 130, the base 150 includes first and second ends 152, 154 that are disposed along a longitudinal axis 156, which axis is parallel to the axes 112, 136. Further, the trough 102, the platform 130 and the base 150 are disposed in a series of planes that are parallel to each other. That is, as illustrated, the trough 102 is disposed above the platform 130, and the platform 130 is disposed above the base 150, such that the platform 130 is disposed between the trough 102 and the base 150.

The conveyor 100 also includes at least one first toroidal resilient member disposed between the trough 102 and the platform 130, and at least one second toroidal resilient member disposed between the platform 130 and the base 150. As mentioned previously, there are two first toroidal members 160, 162 disposed between the trough 102 and the platform 130, and two second toroidal members 164, 166 disposed between the platform 130 and the base 150.

In particular, the first toroidal members 160, 162 have a first surface that abuts the trough 102 (or a mount that is considered to be part of the trough 102), and a second surface that abuts the platform 130 (or a mount that is considered to be part of the platform 130). Similarly, the second toroidal members 164, 166 a first surface that abuts the platform 130 (or a mount that is considered to be part of the platform 130), and a second surface that abuts the base 150 (or a mount that is considered to be part of the base 150).

The toroidal resilient members 160, 162, 164, 166 include an annular rubber or synthetic polymer ring having an opening disposed in the center about a central axis. The central axes of first toroidal resilient member 160 and second toroidal resilient member 164 are coincident (or aligned) with each other in the configuration illustrated. The central axes of first toroidal resilient member 162 and second toroidal resilient member 166 are coincident (or aligned) with each other in the configuration illustrated.

The central axes of all members 160, 162, 164, 166 are transverse to a plane in which the floor 104 of the trough 102 is disposed. In addition, in the configuration illustrated, the central axes 160, 162, 164, 166 are transverse to the axes 133, 135 of the motor shafts of the motors 142, 144. That is, if the longitudinal axis 112 (and axes 136, 156) are considered to be in the x-direction, and the axes 133, 135 of the motor shafts of the motors 142, 144 are considered to be in the y-direction, the central axes of the members 160, 162, 164, 166 are considered to be in the z-direction. While the axes are illustrated as orthogonal to each other in the illustrated embodiment, the axes need not be orthogonal in all embodiments while still considered to be transverse to each other.

In operation, the motion of the respective eccentric masses about the shafts of the motors 142, 144 can cause items disposed on the surface 106 to move, for example, from the end 108 to the end 110, or from the end 110 to the end 108. This may be achieved, for example, by operating one motor 142, 144 at a time, or by operating both motors 142, 144 differently so as to cause the motion of the items to be towards the end 108 or the end 110. For that matter, it may be possible according to certain embodiments to vary the eccentric masses so as to cause the motion of the items to be towards the end 108 or the end 110.

While it may be possible to operate the motors 142, 144 manually to cause the motion to be towards end 108 or end 110, for example through the use of a switch, the motors 142, 144 may be coupled to a controller 170 to permit automated control instead. The controller 170 may be configured (e.g., programmed) to operate the motors 142, 144 to change the direction of motion of items along the floor 104 according to specific timings, or in response to sensors mounted along the trough 102 between the ends 108, 110, for example. As mentioned previously, the controller 170 may be in the form of a processor and memory, in the form of discrete electronic circuitry, or some combination thereof.

A second embodiment of the conveyor is illustrated in FIGS. 2 and 3. The conveyor 200 of FIG. 2 shares many features in common with the conveyor 100 of FIG. 1. Unless specifically disclaimed, it will be recognized that the comments made relative to conveyor 100 apply to conveyor 200, even though the comments are not repeated below. For example, the trough 202 of the conveyor 200 also may be curved, as opposed to linear, according to some variants.

As mentioned above, the conveyor 200 includes a trough 202 with a floor 204 having an upper surface 206 configured to receive items to be conveyed in at least a first direction from a first end 208 to a second end 210. The first and second ends 208, 210 are disposed along a longitudinal axis 212 as illustrated.

The trough 202 has side walls 214, 216 that define the first and second sides (or edges) 218, 220 of the floor 204. See also FIG. 3. The side walls 214, 216 may depend from the sides 218, 220 of the floor 204 at an obtuse angle as illustrated. Alternatively, the side walls 214, 216 may be orthogonal to the floor 204 according to other embodiments, for example.

The conveyor 200 also includes a platform 230 with at least one exciter 232 attached thereto. As illustrated, there is one exciter 232. The exciter 232 has at least one shaft with an eccentric mass attached thereto, the shaft having an axis of rotation 233 about which the mass is rotated.

The trough 202 has first and second ends 208, 210 spaced from each other along the longitudinal axis 212. Further, the platform 230 has a longitudinal axis 236 along which first and second ends 238, 240 are disposed (compare FIGS. 2 and 3), with the longitudinal axis 236 of the platform 230 parallel to the longitudinal axis 212 of the trough 202. Further, the exciter 232 includes a motor 242 having a motor shaft with at least one eccentric mass disposed on the motor shaft.

In addition, the conveyor 200 includes a base 250. Like the trough 202 and the platform 230, the base 250 includes first and second ends 252, 254 (compare FIGS. 2 and 3) that are disposed along a longitudinal axis 256, which axis is parallel to the axes 212, 236. Further, the trough 202, the platform 230 and the base 250 are disposed in a series of planes that are parallel to each other. That is, as illustrated, the trough 202 is disposed above the platform 230, and the platform 230 is disposed above the base 250, such that the platform 230 is disposed between the trough 202 and the base 250.

The conveyor 200 also includes at least one first toroidal resilient member disposed between the trough 202 and the platform 230, and at least one second toroidal resilient member disposed between the platform 230 and the base 250. As mentioned previously, there are two first toroidal members 260, 262 disposed between the trough 202 and the platform 230, and two second toroidal members 264, 266 disposed between the platform 230 and the base 250. Compare FIGS. 2 and 3.

The toroidal resilient members 260, 262, 264, 266 include an annular rubber ring having an opening disposed in the center about a central axis. The central axes of first toroidal resilient member 260 and second toroidal resilient member 264 are coincident (or aligned) with each other, in the configuration illustrated in FIG. 2. The central axes of the other pair of first toroidal resilient member 262 and second toroidal resilient member 264 also are coincident (or aligned) with each other as seen in FIG. 3.

According to the embodiment of FIGS. 2 and 3, the base 250 is attached to the trough 202 by first and second rigid side walls 270, 272. The first and second rigid side walls 270, 272 are disposed to either side of the floor 204 of the trough 202. As illustrated, each of the side walls 270, 272 includes a plurality of side wall panels 274, 276, 278, 280, with two of the side wall panels 274, 278 disposed at the first ends 208, 252 of the trough 202 and base 250 (see FIG. 2), and two of the side wall panels 276, 280 disposed at the second ends 210, 254 of the trough 202 and the base 250. The side walls 270, 272 may be attached to the trough 202 and base 250 by fasteners, for example.

It will be recognized that the base 250 may include two parts, in the same fashion that the side walls 270, 272 may each include two side wall panels. According to such an embodiment, one of the sets of side wall panels 274, 278 may attach one part of the base to the first end 208 of the trough 202, and the other of the sets of side wall panels 276, 280 may attach the other part of the base to the second end 210 of the trough 202.

The exciter 232 comprising the motor 242 is disposed between the first and second ends 238, 240 of the platform 230. According to the illustrated embodiment, the motor 242 is disposed such that the axis of the motor 242 is disposed along the midpoint of the platform 230 between the ends 238, 240.

In fact, the platform 230 includes a motor housing 280 disposed between the first and second ends 238, 240 of the platform 230. The motor housing 280 having first and second openings (of which 282 is illustrated) on first and second sides (of which 286 is illustrated), and the first and second rigid side walls 270, 272 have first and second openings (of which 290 is illustrated) aligned with the first and second openings 282 of the motor housing 280.

As illustrated, the platform 230 has flanges 300, 302 each of which depends to from one side or the other of the motor housing 280. The flanges 300, 302 are disposed between a U-shaped mounting bracket 304, 306 attached to (and considered part of) the trough 202 and a second U-shaped mounting bracket 308, 310 attached to (and considered part of) the base 250. The toroidal members 260, 264 are disposed between the flange 300 and the brackets 304, 308, with opposing surfaces of the toroidal members 260, 264 abutting the flange 300 and the brackets 304, 308 (or mounts that may be considered to be part of the flange 300 and brackets 304, 308). The toroidal members 262, 266 are disposed between the flange 302 and the brackets 306, 310, with opposing surfaces of the toroidal members 260, 264 abutting the flange 300 and the brackets 306, 310 (or mounts that may be considered to be part of the flange 300 and brackets 306, 310).

The conveyor 200 may also include a plurality of resilient members 312 disposed between the base 250 and ground (which may include a frame 312) disposed (or attached) to ground.

In operation, the motion of the eccentric masses about the shaft of the motor 242 can cause items disposed on the surface 206 to move, for example, from the end 208 to the end 210, or from the end 210 to the end 208. Motion in both directions may be achieved, for example, by including a bidirectional motor, and operating the motor in one direction or the other.

While it may be possible to operate the motor 242 manually to cause the motion to be towards end 108 or end 110, for example through the use of a switch, the motor 242 may be coupled to a controller 320 to permit automated control instead. The controller 320 may be configured (e.g., programmed) to operate the motor 242 (which motor 242 may be a bi-directional motor) to change the direction of motion of items along the floor 204 according to specific timings, or in response to sensors mounted along the trough 202 between the ends 208, 210, for example. As mentioned previously, the controller 320 may be in the form of a processor and memory, in the form of discrete electronic circuitry, or some combination thereof.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A conveyor comprising:
    a trough with a floor having an upper surface configured to receive items to be conveyed in at least a first direction from a first end to a second end;
    a platform with at least one exciter attached thereto, the at least one exciter having at least one shaft with an eccentric mass attached thereto, the at least one shaft having an axis of rotation about which the mass is rotated;
    a base; and
    at least one first toroidal resilient member disposed between the trough and the platform, and at least one second toroidal resilient member disposed between the platform and the base.

2. The conveyor according to claim 1, wherein:
    the trough has a longitudinal axis, with the first and second ends spaced from each other along the longitudinal axis;
    the platform has a longitudinal axis along which first and second ends are disposed, with the longitudinal axis of the platform parallel to the longitudinal axis of the trough; and
    the base has a longitudinal axis along which first and second ends are disposed, with the longitudinal axis of the platform parallel to the longitudinal axes of the trough and the platform.

3. The conveyor according to claim 2, wherein:
    each of the at least one first toroidal resilient member has a central axis and each of the at least one second toroidal resilient member has a central axis, and
    the central axes of the at least one first toroidal resilient member and the at least one second toroidal resilient member are transverse to the longitudinal axes of the trough, platform and base.

4. The conveyor according to claim 3, wherein the central axes of the at least one first toroidal resilient member and the at least one second toroidal resilient member are transverse to the axis of rotation of the at least one shaft.

5. The conveyor according to claim 3, wherein the central axis of each of the at least one first toroidal resilient member is parallel to or colinear with the central axis of each of the at least one second toroidal resilient member.

6. The conveyor according to claim 3, wherein:
    the at least one first toroidal resilient member comprises a first toroidal resilient member disposed between the first end of the trough and the first end of the platform, and a first toroidal resilient member disposed between the second end of the trough and the second end of the platform, and
    the at least one second toroidal resilient member comprises a second toroidal resilient member disposed between the first end of the platform and the first end of the base, and a second toroidal resilient member disposed between the second end of the platform and the second end of the base,
    wherein the central axis of the first toroidal resilient member disposed between the first end of the trough and the first end of the platform is colinear with the central axis of the second toroidal resilient member disposed between the first end of the platform and the first end of the base, and
    wherein the central axis of the first toroidal resilient member disposed between the second end of the trough and the second end of the platform is colinear with the central axis of the second toroidal resilient member disposed between the second end of the platform and the second end of the base.

7. The conveyor according to claim 6, wherein the at least one exciter comprises a single exciter is disposed on the platform between the first and second ends of the platform,
    wherein the first toroidal resilient member disposed between the first end of the trough and the first end of the platform and the second toroidal resilient member disposed between the first end of the platform and the first end of the base is on one side of the single exciter, and
    wherein the first toroidal resilient member disposed between the second end of the trough and the second end of the platform and the second toroidal resilient member disposed between the second end of the platform and the second end of the base is on an opposite side of the single exciter.

8. The conveyor according to claim 6, wherein the at least one exciter comprises two exciters, each exciter comprising a shaft, a first of the two exciters disposed at the first end of the platform and a second of the two exciters disposed at the second end of the platform.

9. The conveyor according to claim 1, wherein the at least one exciter comprises a motor having a motor shaft, wherein the motor shaft is the at least one shaft.

10. The conveyor according to claim 1, wherein the toroidal resilient members comprise an annular rubber or synthetic polymer ring having an opening disposed in the center.

11. The conveyor according to claim 1, wherein:
    the trough has a longitudinal axis, with the first and second ends spaced from each other along the longitudinal axis;
    the platform has a longitudinal axis along which first and second ends are disposed, with the longitudinal axis of the platform parallel to the longitudinal axis of the trough; and
    the at least one exciter comprising a first motor having a motor shaft with at least one eccentric mass disposed on the motor shaft of the first motor, and a second motor having a motor shaft with at least one eccentric mass disposed on the motor shaft of the second motor, the first motor disposed at the first end of the platform and the second motor disposed at the second end of the platform.

12. The conveyor according to claim 11, wherein the toroidal resilient members comprise an annular rubber or synthetic polymer ring having an opening disposed in the center about a central axis, the central axis of the at least one first toroidal resilient member and the central axis of the at least one second toroidal resilient member parallel or coincident with each other, the central axes being transverse to a plane in which the floor of the trough is disposed.

13. The conveyor according to claim 1, wherein:
    the trough has a longitudinal axis, with the first and second ends spaced from each other along the longitudinal axis;

the platform has a longitudinal axis along which first and second ends are disposed, with the longitudinal axis of the platform parallel to the longitudinal axis of the trough;

the base attached to the trough by first and second rigid side walls, the first and second rigid side walls disposed to either side of the floor of the trough; and the at least one exciter comprising a first motor having a motor shaft with at least one eccentric mass disposed on the motor shaft of the first motor, the first motor disposed between the first and second ends of the platform.

14. The conveyor according to claim 13, wherein the platform includes a motor housing disposed between the first and second ends of the platform, the motor housing having first and second openings on first and second sides, and the first and second rigid side walls having first and second openings aligned with the first and second openings of the motor housing.

15. The conveyor according to claim 13, further comprising a plurality of resilient members disposed between the base and ground.

16. The conveyor according to claim 13, wherein the toroidal resilient members comprise an annular rubber or synthetic polymer ring having an opening disposed in the center about a central axis, the central axis of the at least one first toroidal resilient member and the central axis of the at least one second toroidal resilient member parallel or coincident with each other, the central axes being transverse to a plane in which the floor of the trough is disposed.

* * * * *